United States Patent [19]
Caudill

[11] Patent Number: 4,980,961
[45] Date of Patent: Jan. 1, 1991

[54] METHOD OF FORMING A DOUBLE UPSET TUBE ASSEMBLY

[75] Inventor: Maurice L. Caudill, Peoria, Ill.

[73] Assignee: Caterpillar Inc., Peoria, Ill.

[21] Appl. No.: 379,857

[22] Filed: Jul. 14, 1989

[51] Int. Cl.$^5$ .................. B21D 39/00; B21D 41/02; F16L 13/14

[52] U.S. Cl. .................. 29/509; 72/316; 285/382.5; 29/523

[58] Field of Search ............ 29/505, 509, 511, 512; 72/316, 317, 318, 367, 368, 370; 285/386, 382.4, 382.5; 138/109

[56] References Cited

U.S. PATENT DOCUMENTS

| | | | |
|---|---|---|---|
| 2,545,930 | 3/1951 | Richardson | 285/87 |
| 2,613,958 | 10/1952 | Richardson | 285/120 |
| 3,263,476 | 8/1966 | Hinderer | 72/386 |
| 4,845,972 | 7/1989 | Takeuchi et al. | 72/370 |

FOREIGN PATENT DOCUMENTS 867468  1/1980  U.S.S.R. ................ 72/316

OTHER PUBLICATIONS

Sales Brochure of Lorine Manufacturing Co., "Metal Tubing Fabricators".

Primary Examiner—Timothy V. Eley
Assistant Examiner—S. Thomas Hughes
Attorney, Agent, or Firm—Sterling R. Booth, Jr.

[57] ABSTRACT

A tube assembly is formed by placing a sleeve member over an end portion of a tube and then placing the tube and sleeve in a die. A movable punch is then pressed against a projecting end portion of the tube thereby forming a radially extending double upset flange integrally with the sleeve member. The sleeve member has contact surfaces against which a substantial portion of the radially extending double upset flange conforms. A portion of the outer surface of the tube, and the entire surface of a compound curved fillet extending from the outer surface of the tube to a radially outwardly extending surface of the flange also conform to the sleeve member.

2 Claims, 5 Drawing Sheets

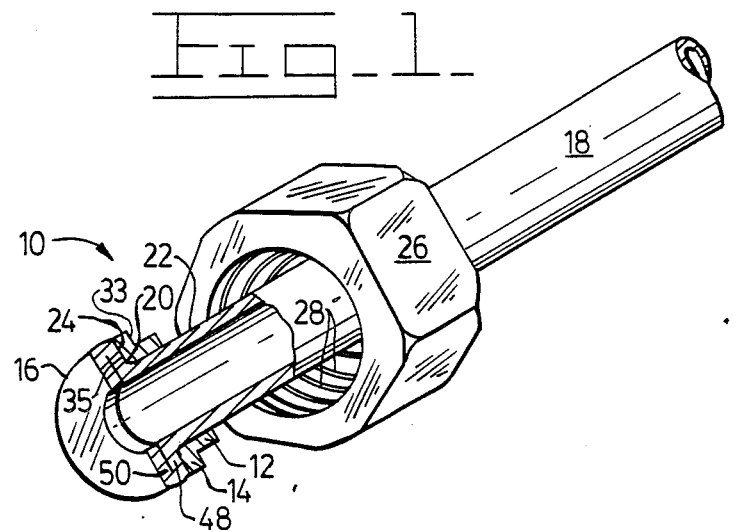
Fig_1_
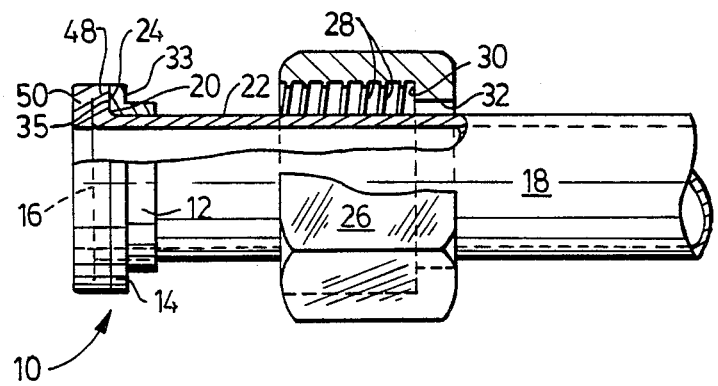
Fig_2_

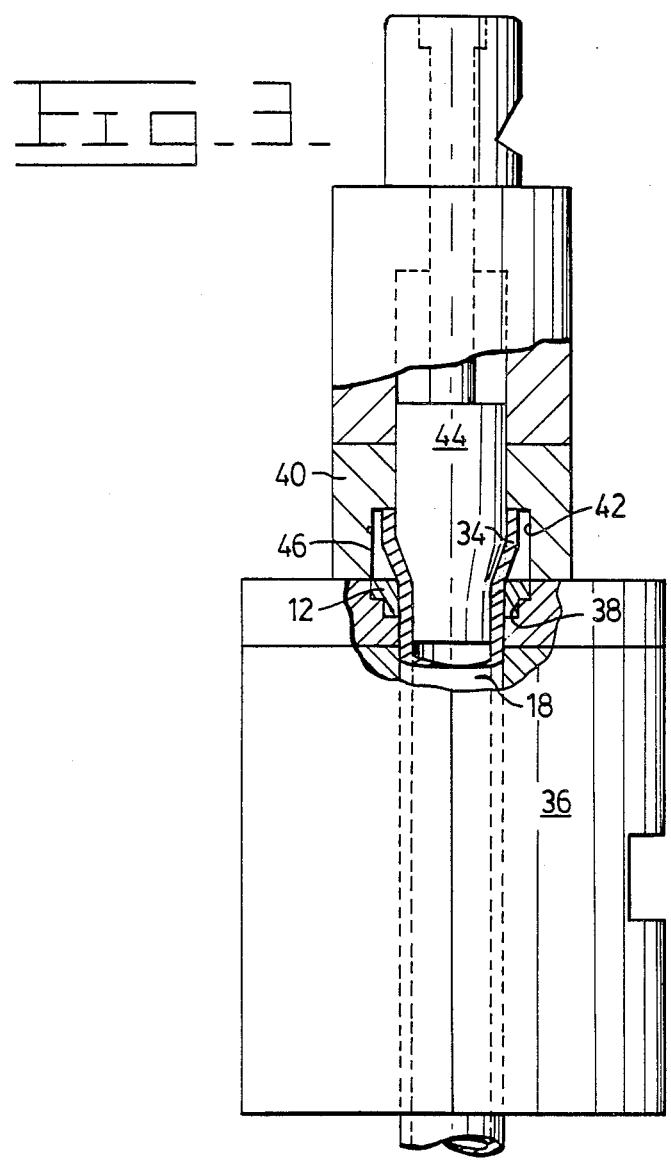
Fig_3_
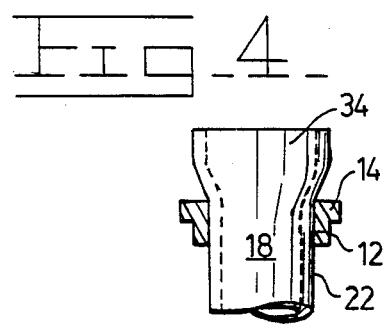
Fig_4_

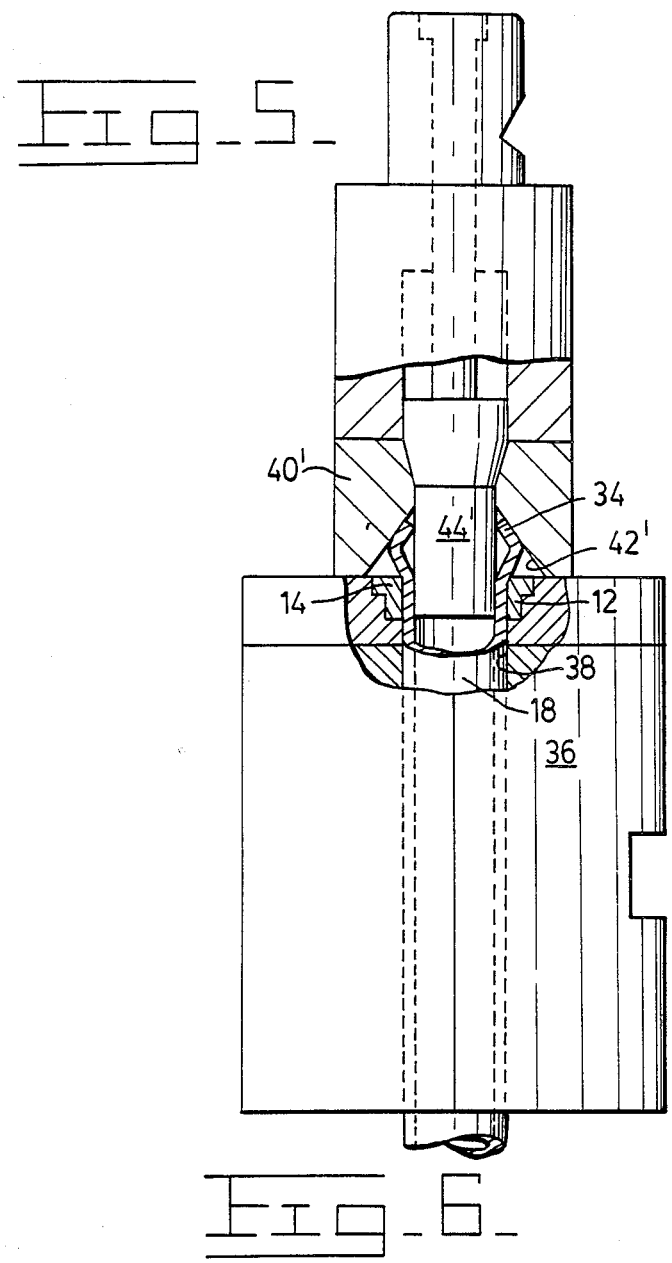
Fig_5_
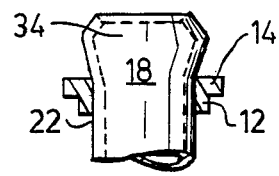
Fig_6_

METHOD OF FORMING A DOUBLE UPSET TUBE ASSEMBLY

DESCRIPTION

1. Technical Field

This invention relates generally to a tube end assembly and more particularly to such an assembly having a double upset flange integrally formed with a sleeve member.

2. Background Art

Mechanical connections between rigid high pressure hydraulic system components typically are prone to failure because of limited fatigue life. Vibrations from vehicle mechanical systems and dynamic hydraulic system elements routinely subject such mechanical connections to severe cyclic loads. Component misalignment causes a static load while internal fluid pressure fluctuations and thermally induced dimensional changes generate additional dynamic loads which combine to further complicate and increase the severity of the loading. Given these severe loading conditions, maintaining tight, leak-proof connections between vehicle mounted high pressure hydraulic system components is a challenging problem.

Unequal compressive force distribution on the tube surface can acerbate these severe operating loads. Generally, hydraulic pipe or rigid tube fittings include threads to enable separating individual components for installation and service. Threaded fittings typically form a leak-proof seal by pressing a flared or flanged end of the tubing against a mating surface of another component. A long-necked nut mounts on and aligns with the tubing to bear against the tube flare or flange to draw the tube and mating surface together thus maintaining them in sealing relationship to one another. Friction develops between the nut and the flange during tightening and often produces an undesirable, unequal compressive force distribution on the tube surface.

Such tube assemblies commonly fail by the tube wall cracking in the curved fillet which is the transition between the straight and flared or flanged tube portions. Stresses arising from the previously described load conditions concentrate in this fillet. Prior methods for forming the tube flange or flare use a split die to clamp the tube during the tube end forming process. This split die leaves die marks in the fillet area which aggravate the stress state there and cause premature initiation of cracks. Such tube end forming processes actually contribute to premature tube assembly failure.

One approach to extending tube assembly life is to braze a preformed fitting onto the tube end to avoid deforming the tube wall. This solution is costly and the brazed assemblies are susceptible to tube wall crack failure near the end of the brazed fitting.

Another approach to improving threaded hydraulic tube assembly fatigue life is to reinforce them by inserting a preformed sleeve such as a flange between the nut and preformed tube pressure contact surfaces (i.e., the flair or flange) prior to assembly. This approach also has a number of problems. The conformance of the preformed sleeves to the tubes varies substantially because of size variations normally acceptable in commercially available hydraulic tubing. In addition, separately formed sleeves and flanges inherently have incongruous mating surfaces having an absence of substantial conformity between respective abutting surfaces. Outer tube surface gouges may result from installing sleeves which are too tight to easily fit over the tube ends. Contact between the sleeve and the tube is nonuniform if the sleeves are oversized or have a surface shape which does not intimately conform to the radius of the curved tube fillet. Tube surface gouges and nonuniform contact between the tube fillet and sleeve act as stress risers where small cracks develop. Normal operating stresses may cause these cracks resulting from a less than ideal match between the tube and sleeve surfaces to eventually propagate through the tube wall thus limiting fitting load capacity and fatigue life.

The present invention is directed to overcoming one or more of the problems set forth above. It is desirable to have an economical connector for joining rigid elements of a hydraulic system that has improved fatigue life properties and is less prone to failure.

DISCLOSURE OF THE INVENTION

In accordance with one aspect of the present invention, a tube assembly includes a tube having a double upset flange formed on one end with a curved fillet extending between the outer surface of the tube and an outwardly extending surface of the flange. The upset flange portion of the tube is integrally formed with a preformed rigid sleeve member that circumscribes the tube and abuts the outwardly extending surface of the flange. As a result of being formed integrally with the rigid sleeve member, the contour of the curved fillet, a substantial portion of the outwardly extending surface of the flange, and a portion of the outer tube surface identically conform with contacting mating surfaces of the rigid sleeve member.

In another aspect of the present invention, a method for forming a tube assembly having a radially extending flange at an end thereof comprises inserting a preformed rigid sleeve member over an end portion of the tube prior to placing the tube and sleeve member in a die in which portions of the sleeve member become the shaping surface for a portion of the tube. After clamping the tube and prepositioned sleeve member in the die, a movable punch is pressed against the tube end thereby upsetting a portion of the tube end and forming a radially extending flange. The contour of a substantial portion of the flange surface and the surface of the curved fillet are shaped by the preformed sleeve member. A connection member is placed on the tube member prior to forming the upset flange or, alternatively, after forming by installing over an opposite unformed end of the tube member.

Other features of the tube assembly include a double upset flange integrally formed with the preformed rigid sleeve. The sleeve is disposed in an abutting relationship with a radially outwardly extending portion of the double upset flange.

Other features of the method for forming the tube assembly include upsetting the end portion of the tube member to form a first radially outwardly extending wall portion and a second radially inwardly extending wall portion. The first wall portion is formed in an abutting relationship with respect to the sleeve member.

BRIEF DESCRIPTION OF THE DRAWINGS

FIG. 1 is an isometric view of a tube assembly embodying the present invention;

FIG. 2 is a plan view of the tube assembly with portions of the tube assembly shown in section;

FIG. 3 is a plan view of a punch and die apparatus suitable for performing the method and with portions of the apparatus and tube assembly broken away to show one forming step;

FIG. 4 is a plan view of the tube, with the sleeve member shown in section, after completion of the forming step illustrated in FIG. 3;

FIG. 5 is a plan view of a punch and die apparatus with portions of the apparatus and tube assembly broken away to show an intermediate forming step;

FIG. 6 is a plan view of the tube, with the sleeve member shown in section, after completion of the intermediate forming step illustrated in FIG. 5;

BEST MODE FOR CARRYING OUT THE INVENTION

Figure 7:
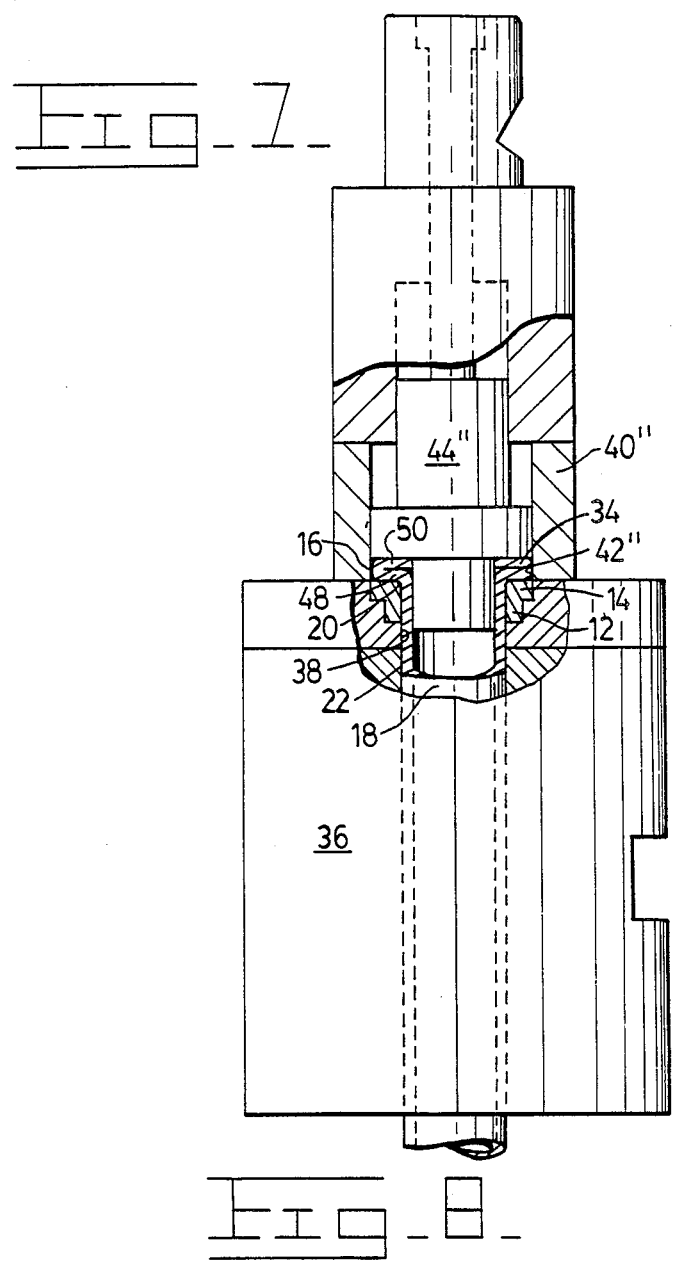
FIG. 7 is a plan view of a punch and die apparatus with portions of the apparatus and tube assembly broken away to show a forming step.

A tube assembly, generally indicated by the reference numeral 10 in FIGS. 1 and 2, comprises a rigid preformed sleeve member 12 circumscribing a tube 18 having a double upset flange 16 integrally formed with the sleeve member 12. Typically, the tube 18 is constructed of steel. In the present embodiment, the preformed sleeve 12 is preferably constructed of a steel material having a hardness at least equal to that of the tube material.

A compound curved fillet 20 extends from an outer surface 22 of the tube 18 to a radially outwardly extending surface 24 of the double upset flange 16. A connection member 26 having internal threads 28 and a radially inwardly extending shoulder 30, is adapted for threaded engagement with a mating threaded fitting, not shown. The connection member 26 has an internal bore 32 that has a diameter only slightly larger than the outer diameter of the first portion 13 of the rigid sleeve member 12. The connection member 26 is mounted on the tube 18 in circumscribing relationship with respect to the first portion 13 of the rigid sleeve member 12 and the tube 18. When connected to a mating fitting, the shoulder 30 of the connection member 26 is drawn into pressure contact with an inner surface 33 of the radial portion 14 of the sleeve member 12. In the connected or operating position, the connection member 26 advantageously contacts only the sleeve member 12 and does not bear directly against any portion of the tube 18 or the tube double upset flange 16.

Figure 9:
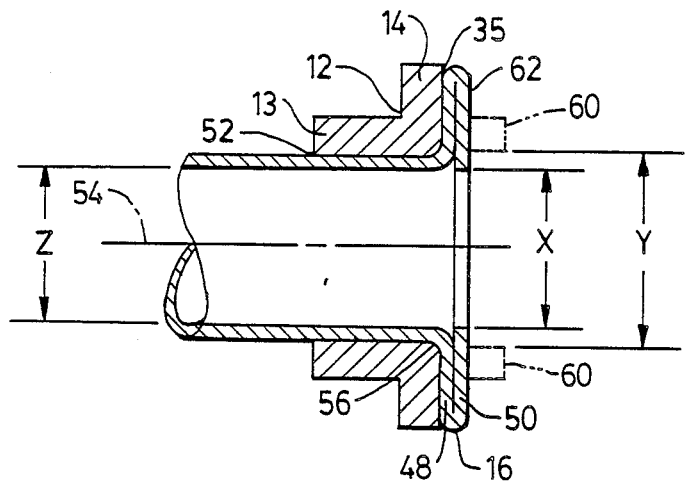
FIG. 9 is a longitudinal section of the tube assembly.

As best illustrated by FIG. 9, the rigid sleeve member 12 surrounding the tube member 18 at one end thereof is generally L-shaped in cross section, has a first portion 13 circumscribing said tube member and a radial portion 14 extending outwardly from one end of the first portion 13. The first portion 13 has a cylindrical inner surface 52. The radial portion 14 has an outer surface 35 extending in a plane perpendicular to an axis of symmetry 54 of the tube 18. A compound curved interconnecting surface 56 extends between the first 13 and radial 14 portions of the rigid sleeve member 12. This compound curved interconnecting surface 56 identically conforms to the compound curved fillet 20 which extends from the outer surface 22 of the tube 18 to the radially outwardly extending surface 24 of the double upset flange 16.

As FIG. 9 illustrates, the present embodiment advantageously employs a double upset flange 16 to apply pressure to an O-ring face seal which lies in an O-ring groove 60 on the surface of a mating part (not shown). To insure that the outer surface 62 of the radially inwardly extending portion 50 of the double upset flange 16 remains in sealing relationship with the surface of the mating part, the diameter X into which the inward portion 50 extends must be substantially less than the inner diameter Y of the O-ring groove 60. Experimentation reveals that, as long as the inwardly extending diameter X is less than or equal to the inner diameter Z of the tube 18 adjacent the first portion 13 of the rigid sleeve 12 (which is less than the O-ring inner diameter Y), the O-ring seal functions admirably at high pressure. Care must be taken, however, to insure that the inward portion 50 of the double upset flange 16 does not extend into the tube 18 far enough to adversely affect the flow of fluid through the tube 18.

In the present embodiment, the double upset flange 16 is formed by upsetting an end portion 34 of the tube 18. Upsetting is a forming operation for reshaping metal by plastic flow. Force applied to the end of a blank, contained between a punch and a die, causes metal flow. Upsetting is accomplished by inserting a blank of a preselected length into a stationary die. A punch, moving parallel to the axis of the blank, contacts the end of the blank protruding from the die and compresses the metal. Impressions in the punch or die, or both, determine the upset shape produced. In the present embodiment, the end portion 34 of the tube 18 is the blank to be upset, and the preformed sleeve member 12 serves as an important element of the forming surface which determines the upset shape.

Prior to forming the tube end, the preformed rigid sleeve member 12 is inserted over the end portion 34 of the tube. The rigid sleeve member 12 is then positioned on the tube 18 at a predetermined distance from the tube end. As noted above, the length of tube 18 extending beyond the rigid sleeve member 12 is the portion of the tube 18 that will be subsequently upset and formed into a flange. Hence, it is desirable to accurately position the preformed rigid sleeve member relative to the tube end.

Referring to FIG. 3, the tube 18 with the preformed rigid sleeve 12 positioned thereon is then placed between opposed halves of a split die 36 which is in an open position to receive the tube 18 and rigid sleeve 12. As shown in FIGS. 3, 5 and 7, the split die 36 has an internal cavity 38 shaped to receive the tube 18 and preformed rigid sleeve 12 and tightly clamp about both members when the die is closed. The tube 18 and sleeve 12 remain rigidly clamped with respect to the die 36 and to each other during the ensuing tube end forming operation. Any die marks impressed on the clamped workpieces are thus imposed on the sleeve 12 and on the outer surface of the tube 18 at a position spaced from the end portion 34 and the fillet 20.

After closing the split die 36 and clamping the tube 18 and sleeve 12 therein, an upper die 40 having a cavity 42 defined therein is closed against the split die. A punch 44, is movably mounted within the upper die 40 in coaxial relationship with the tube 18. After the upper die is closed, a die cavity 46 completely surrounding the end portion 34 of the tube is defined by an outer surface 35 of the radially extending rim portion 14 of the sleeve member 12, the fixed surfaces of the die cavity 42, and by external surfaces of the movable punch 44.

In the initial forming step of a double upset flange, the movable punch 44 is forcibly pressed into the end portion 34 of the tube 18 thereby expanding the tube 18 outwardly against the rigid sleeve member 12, and further expanding the end portion 34 outwardly as shown in FIG. 4.

After initially expanding the end portion 34, the upper die 40 and punch 44 are withdrawn and replaced by a second upper die 40' and punch 44' arrangement as shown in FIG. 5. In the intermediate forming step following the initial expansion of the tube end portion 34, the movable punch 44' is inserted into the bore of the tube member 18 and the upper die 40' pressed into contact with the split die 36. The conically shaped surfaces defining the internal cavity 42' fold the anterior portion of the tube end 34 inwardly and partially collapse the end portion 34 thereby forming the intermediate shape shown in FIG. 6.

Figure 8:
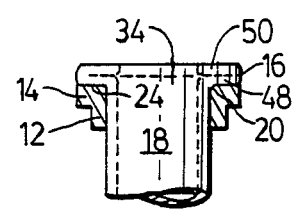
FIG. 8 is a plan view of the tube, with the sleeve member shown in section, after completion of the forming step illustrated in FIG. 7.

The second upper die 40' and punch 44' are withdrawn after the intermediate forming operation and replaced by a third upper die 40" and punch 44" as shown in FIG. 7. In the final forming operation, upper die 40" is closed against the split die 36, and the punch 44" pressed into the bore of the tube 18. This action forces surfaces defined on the punch 44" against the partially formed end portion of the tube 18 and, acting in cooperation with the die cavity 42" and the sleeve member 12, forms the end portion of the tube into a double upset flange 16 as shown in FIG. 8.

Specifically, the formed end portion of the tube comprises a flange 16 having a first radially outwardly extending wall portion 48 and a second radially inwardly extending wall portion 50, with the sleeve member 12 disposed in an abutting relationship against the first wall portion 48. The double upset flange arrangement also advantageously provides a smooth surface, without requiring additional machining, on the outer face of the radially inwardly extending wall portion 50. This face surface, when the assembly is connected to a mating fitting, generally bears against an O-ring (not shown) to provide a face type seal between the two members.

Most significantly, by the above operation, the shape and contour of a substantial portion of the radially outwardly extending surface 24 of the flange, the outer tube surface 22 adjacent the tube end, and the entire surface of the compound curved fillet 20 is formed directly against the preformed sleeve member 12. Thus, it is assured that in their assembled positions, these tube and flange surfaces will exactly conform to respective contact surfaces on the preformed sleeve member 12.

The term "conform" as used herein and in the claims, means "identically coinciding with" and specifically describes the intimate contact between mating surfaces at least one of which is formed, in situ, against the other surface, such as by pressing them together in a die. Press formed articles shaped in separate dies characteristically do not have sufficient compliance between respective mating surfaces to satisfy the definition of "conform" a used herein. Therefore, "conform" explicitly describes the shape and contour relationship of respective mating surfaces of the tube 18, the upset flange 16 and the sleeve 12 when the flange 16 is formed in situ against the preformed sleeve 12.

Another significant benefit of the above described method for forming the flange 16 integrally with the sleeve 12 is that there will be no undesirable die marks imprinted upon the formed tube surfaces. As discussed above, die marks near the fillet 20 of the tube 18 are undesirable. The method discussed herein may form die marks on the outer surface 22 of the tube 18; however, these die marks are not near the tube fillet 20.

INDUSTRIAL APPLICABILITY

A tube assembly 10 having a double upset flange 16 integrally formed with a rigid sleeve member 12 as described above, is particularly useful in high pressure and severe vibration applications such as hydraulic systems for heavy construction equipment.

It has been found that the integrally formed tube and sleeve arrangement improves fatigue life by as much as 40 percent in comparison with similar tube assemblies in which the flange is not formed in situ against the sleeve. Furthermore, the integrally formed upset tube and sleeve assembly is much more economical to produce than brazed assemblies.

Other aspects, features and advantages of the present invention can be obtained from a study of the drawings, this disclosure, and the appended claims.

I claim:

1. A method for forming a tube assembly having a double upset radially extending flange extending perpendicularly to an axis of the tube assembly and at an end of a tube member of the tube assembly and supported by an L-shaped sleeve member having a first portion extending along the axis of the tube member in intimate contact with an outer surface of the tube member, a radial portion extending radially outwardly and an inner portion in intimate contact with an outwardly extending surface of the flange adjacent and perpendicular to the first portion, and a compound interconnecting surface extending between the radially outwardly extending portion and the first portion and in intimate contact with a compound curved fillet extending from the outer surface of the tube member and the outwardly extending surface of the double upset flange and having an outer surface, said method comprising:

inserting an end portion of the tube member into the sleeve member;

positioning the outwardly radially extending portion of the sleeve member at a predetermined distance from the end of the tube member;

holding the sleeve member in fixed relation to the end of the tube in an internal cavity of a split die;

expanding the tube member outwardly into intimate contact with the first portion of the sleeve member with a first punch extending into the end of the tube member and forming the tube end against and conforming to the compound curved interconnecting surface of the sleeve member; and upsetting the end of the tube member with a T-shaped punch extending into the end of the tube member to form the double radial flange against the outwardly extending surface of the radial portion of the sleeve member, said T-shaped punch maintaining a diameter of a radially inwardly extending portion of the double upset flange substantially equal to the inner diameter of the tube member and simultaneously maintaining the original inner diameter of the tube member within the sleeve member.

2. A method for forming a tube assembly having a double upset radially extending flange extending perpendicularly to an axis of the tube assembly and at an end of a tube member of the tube assembly and supported by an L-shaped sleeve member having a first portion extending along the axis of the tube member in intimate contact with an outer surface of the tube member, a radial portion extending radially outwardly and an inner portion in intimate contact with an outwardly extending surface of the flange adjacent and perpendicular to the first portion and a compound interconnecting surface extending between the radially outwardly extending portion and the first portion and in intimate contact with a compound curved fillet extending from the outer surface of the tube member and the outwardly extending surface of the double upset flange and having an outer surface, said method comprising:

- inserting the sleeve member and the tube member into a split die, said tube member extending a predetermined distance through the sleeve member to provide sufficient material for the double upset flange and said sleeve member supported in a cavity of the split die to serve as a portion of a forming surface in the cavity;
- closing the die, clamping the sleeve member and the tube member therein;
- inserting a cylindrical end of a first punch into the tube member and expanding the end portion of the tube member against an inner cylindrical surface of a first portion of said sleeve member circumscribing the tube member, and engaging a frusto-conical portion of the first punch against the tube member and forming the tube end against and conforming to the compound curved interconnecting surface of the sleeve member; and
- forcing a T-shaped punch into the end portion of the tube member and forming a first radially outwardly extending wall portion and a second radially inwardly extending flat wall portion, said first and second wall portions being formed in abutting relationship with respect to one another and into intimate contact with the outer surface of the sleeve member,
- said T-shaped punch maintaining a diameter of the radially inwardly, extending portion of the double upset flange substantially equal to the inner diameter of the tube member and maintaining the original inner diameter of the tube member within the sleeve member.

* * * * *